United States Patent

[11] 3,582,797

| [72] | Inventor | Alton F. Riethmeier |
| | | Rochester, N.Y. |
| [21] | Appl. No. | 727,534 |
| [22] | Filed | May 8, 1968 |
| [45] | Patented | June 1, 1971 |
| [73] | Assignee | Zerox Corporation |
| | | Rochester, N.Y. |

[54] PHASE COMPARISON CONTROL SYSTEM
3 Claims, 3 Drawing Figs.

[52] U.S. Cl. ............................................. 328/155,
328/55, 328/63, 328/127, 307/313, 318/301
[51] Int. Cl. .................................................... H03b 3/04
[50] Field of Search ........................................ 307/233,
232, 313, 255; 328/133, 134, 109, 110, 155, 141,
55, 63, 127; 318/301

[56] References Cited
UNITED STATES PATENTS
| 2,928,038 | 3/1960 | Huddleston | 328/133X |
| 3,054,062 | 9/1962 | Vonarburg | 328/155X |
| 3,187,195 | 6/1965 | Stefanov | 328/133X |
| 3,304,496 | 2/1967 | Lorenz | 328/232X |
| 3,381,220 | 4/1968 | Burr | 328/55X |
| 3,382,376 | 5/1968 | Sowden | 328/133X |
| 3,478,178 | 11/1969 | Grace | 328/134 |

*Primary Examiner*—John S. Heyman
*Attorneys*—Paul M. Enlow, Ronald Zibelli, James J. Ralabate and Norman E. Schrader ABSTRACT: A phase comparison control system wherein the element to be controlled is a voltage controlled frequency source. A three stage counter is disclosed which is upcounted by a reference pulse train and downcounted by a feedback pulse train. When both frequencies are equal, the output is a square wave wherein the average value thereof is proportional to the phase difference of the two input frequencies. A digitally operated filter is used to generate the analog voltage for control of the frequency source.

PATENTED JUN 1 1971    3,582,797

INVENTOR.
ALTON F. RIETHMEIER
BY Ronald Zibelli
Franklyn C. Weiss
ATTORNEYS

PHASE COMPARISON CONTROL SYSTEM

BACKGROUND OF THE INVENTION

Phase lock servo loops are commonly utilized in the art to synchronize the rotation of a motor shaft, for example, with a reference frequency. That is, the supply reference frequency is phase compared with a feedback frequency obtained from the rotation of the motor shaft, compared and applied to the motor to either increase or decrease the speed thereof accordingly. Phase lock loops have further utility where any feedback frequency is compared to a source frequency for phase control.

A flip-flop circuit is quite commonly used in the art as a phase comparing element. However, it has several severe disadvantages which limit the applicability of the flip-flop as the phase comparing element. First, when in phase lock, the output of the flip-flop is a square wave where the average value is proportional to the phase difference of the input reference and feedback frequencies. Considerable filtering, therefore, is required to derive the average value of the output square wave signal. Second, the average DC level of the output square wave can be at a null when the reference and feedback frequencies are different. Such a condition can cause a false lock indication. Where precise speed or phase control is required, adequate phase comparison must be present in order to maintain reliability of the system.

OBJECTS OF THE INVENTION

It is, therefore, an object of the present invention to provide improved synchronizing circuits.

It is another object of the present invention to provide improved circuits for accurately determining the relative phase between two signals.

It is another object of the present invention to provide an improved phase lock servo loop for phase synchronization.

It is another object of the present invention to provide an improved phase lock loop for use with a voltage controlled oscillator.

It is another object of the present invention to provide a phase lock loop for use with any apparatus which has a frequency output proportional to voltage input.

BRIEF SUMMARY OF THE INVENTION

In accomplishing the above and other desired aspects, Applicant has invented an improved phase lock servo loop where the element to be controlled is a voltage controlled frequency source. Circuitry comprising three flip-flops is provided as the comparing element in a phase lock servo loop to compare a reference frequency with a feedback frequency. The flip-flop circuit operates as a counter where the three flip-flops are set by the reference frequency in a first order and reset in the reverse order by the feedback pulse train. The output from the center flip-flop is a signal the average value of which is proportional to the phase difference between the reference and the feedback pulse trains. The output from the comparing circuit is filtered by a digital technique wherein the reference frequency is subtracted electrically from the output of the comparing network. The result yields only narrow positive or negative going pulses which are averaged to control a voltage controlled oscillator.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
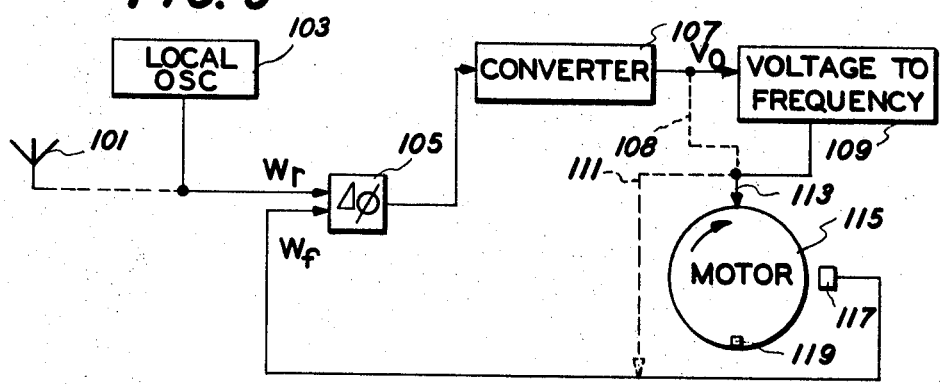
FIG. 1 is a block diagram showing the circuit relationship of the comparing and integrating circuits as described herein.

FIG. 1 is a representative block diagram of a typical phase lock servo loop system. Antenna 101 or local oscillator 103 generates the reference frequency $W_r$. The antenna 101 is shown for purposes of illustration where the reference frequency might be a transmitted signal from one location to another wherein a local apparatus is to be phased therewith. One application therefor might be, for example, in a facsimile transmission system wherein the transmitter scan motor and the receiver motor must be precisely in phase or else there may be distortion in the output document. Any other situation can be imagined where a local apparatus is to operate in synchronism with a remote similar apparatus.

The reference frequency $W_r$, whatever the source, is applied to phase comparison network 105 together with the feedback frequency $W_f$ to which it is compared. This phase comparison circuit 105 could be, set forth above, an ordinary flip-flop logic circuit, but for accurate and reliable operation reference is made to FIG. 2 hereinafter for the present invention. The output from phase comparison circuit 105 is a signal the width of the pulses therein being in direct relation to the relative phase of $W_r$ and $W_f$. This signal is then applied to converter 107 which operates as a pulse width to analog converter and generates the output voltage $V_o$. Reference is made to FIG. 3 for a digital to analog converter circuit of the present invention. The voltage $V_o$ is a voltage in direct relation to the relative phase of the frequencies $W_r$ and $W_f$. $V_o$ is applied to a voltage controlled frequency source which may be any apparatus wherein the output frequency varies in accordance with the applied input voltage.

FIG. 1 shows different embodiments of the voltage controlled frequency source. If motor 115 was a DC motor, then $V_o$ could be directly applied via line 108. If, for example, the voltage controlled frequency source is a voltage controlled oscillator, the output therefrom can be used to drive motor 115 via line 113, or as shown, could more broadly be used as the feedback frequency to phase comparison circuit 105 via line 111. With line 111 in use the voltage controlled oscillator 109 becomes the frequency source for any other type of control apparatus which is desired to be phase synchronized with the reference frequency $w_r$. In this instance, FIG. 1 shows motor 115 which is controlled by the oscillator 109. Designation 119 shows schematically a mark or other type of indicator utilized by sensor 117 to measure the rotation speed of motor 115. For instance, mark 119 could be a magnet which would energize a magnetic pickup 117 to generate the necessary feedback signal $W_f$. Another type of pickup could be optical wherein an optical sensor 117 would detect a mark 119 made on a shaft of the motor 115. In any event, the output from sensor 117 is the feedback frequency $W_f$ which is fed back to phase comparison circuit 105.

If $W_f$ is a lower frequency than $W_r$, the output from phase comparison circuit 105 will vary accordingly and the output from integrator or converter 107 will be at a higher voltage $V_o$. In the instance where a voltage controlled oscillator is utilized, it generates, in response to the higher voltage, a higher frequency therefrom to the motor 115. The motor, sensing the higher supply frequency, picks up speed until the sensor 117 generates signal $W_f$ at a rate equaling $W_r$. At this point voltage $V_o$ to the voltage controlled oscillator 109 will be at the correct level for maintaining the motor speed 115 at the desired rate. The action is similar when the frequency $W_f$ is higher than frequency $W_r$. In this instance the voltage controlled oscillator 109 will generate a lower frequency to thereby slow down the motor 115 to the operating frequency.

Figure 2:
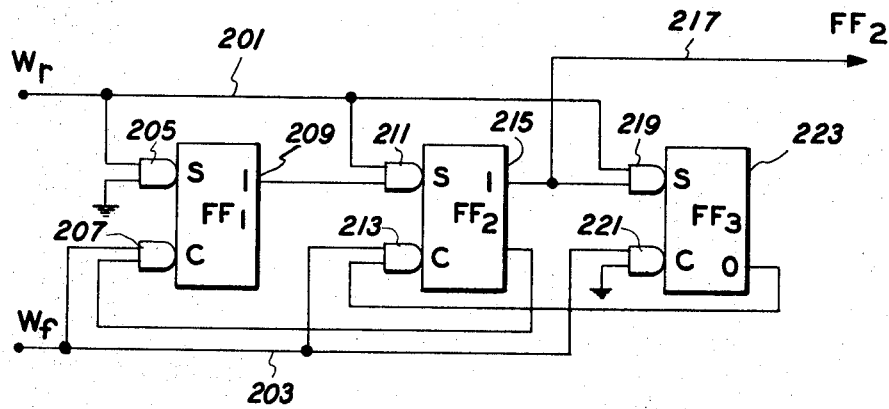
FIG. 2 is the three stage counter which is the comparing circuit in FIG. 1.
Figure 3:
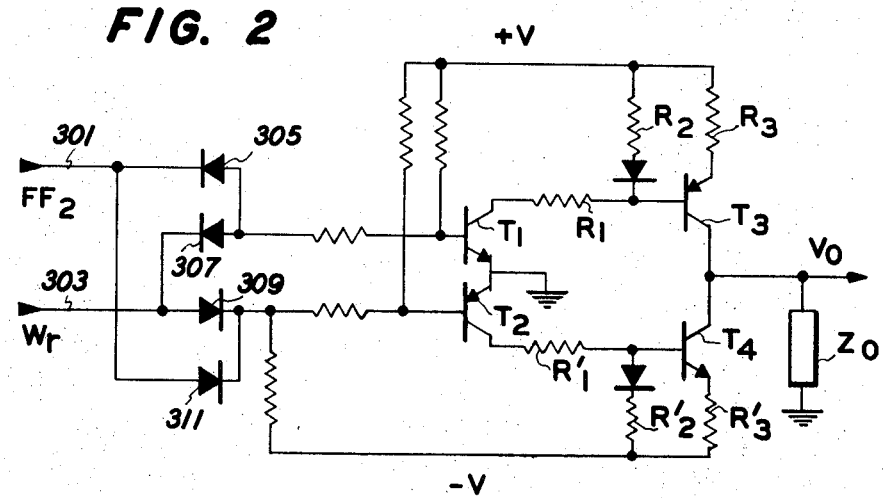
FIG. 3 is the integrator circuit as seen in FIG. 1.

In FIG. 2 is shown the phase comparison circuit 105 shown in block diagram in FIG. 1. The circuit comprises three flip-flops, 209, 215, and 223, so interconnected that they are set in order flip-flop 1, flip-flop 2, and flip-flop 3 by reference pulse train $W_r$ and reset in order flip-flop 3, flip-flop 2, and flip-flop 1 by the feedback pulse train, $W_f$. Thus, if $W_r$, the frequency of the reference pulse train, is greater than $W_f$, the frequency of the feedback pulse train, then flip-flop 2 is held in the "1" state. If $W_f$ is greater than $W_r$, then flip-flop 2 is held in the "0" state. And if $W_f$ exactly equals $W_r$, the flip-flop 2 is set by $W_r$ and reset by $W_f$ and its average output value is proportional to the phase difference therebetween. If for purposes of definition, the flip-flops are set by a ground voltage and reset by a negative voltage, then for a condition when $W_f$ equals zero, as for instance when motor 115 in FIG. 1 is not moving, then the first pulse in the $W_r$ wavetrain will set flip-flop 209 through AND gate 205. The set or "1" output from flip-flop 209, now being at the one output level, will enable AND gate 211. Thus, the next pulse in the $W_r$ wavetrain on line 201 will set flip-flop 215. Now the output of the set or "1" terminal of flip-flop 215 will be at the one level, appearing at the output line 217 and also enabling AND gate 219. The third pulse in the $W_r$ wavetrain will now set flip-flop 223 in the proper sequence.

If, for example, the $W_r$ frequency is zero, the input feedback frequency $W_f$ will reset the flip-flops in reverse order. Thus, the first pulse in the $W_f$ wavetrain will reset flip-flop 223, the output therefrom enabling AND gate 213 of flip-flop 215. The next pulse in the $W_f$ wavetrain will set flip-flop 215, the output therefrom enabling AND gate 207 of flip-flop 209. The third pulse in the $W_f$ wavetrain will now set flip-flop 209 through AND gate 207. The output on line 217, in this instance, will be zero as flip-flop 215 has been reset.

Referring now to FIG. 3, there is shown the pulse width to analog converter circuit 107 operating in accordance with the principles of the present invention. The circuit shown here is a specific embodiment of the converter 107 seen in FIG. 1. The output must be a varying voltage which is proportional to the detected phase error between the reference frequency and the feedback frequency in order to control the voltage controlled oscillator. The output from the phase comparison circuit 105 in FIG. 1 and more fully seen in conjunction with FIG. 2, is a rectangular-shaped wave varying in accordance with the detected difference between frequency $W_r$ and $W_f$. This signal must, therefore, be filtered in order to obtain the necessary analog voltage which can effectively be utilized by the voltage controlled oscillator 109.

The desired filtering can be accomplished with a digital technique as seen in conjunction with FIG. 3. Since the desired steady-state condition is zero phase error, the steady-state output signal $FF_2$ will be a symmetrical square wave. If $W_r$ were also a symmetrical square wave, it could be subtracted from the output of flip-flop 2 without changing the DC value thereof. The output waveform would then be a constant zero, at zero phase error, where small phase errors would yield only narrow, positive or negative-going pulses which are easier to filter since the greater part of their AC energy is at the higher harmonics of $W_r$.

Referring specifically to FIG. 3, signal $FF_2$ is coupled on line 301 to diodes 305 and 311. The reference frequency $W_r$ is coupled on line 303 to diodes 307 and 309. It can be seen that when both $W_r$ and $FF_2$ are in the "high" state, i.e., at ground, diodes 305 and 307 are cut off while diodes 309 and 0, conduct. The base, therefore, of transistor $T_2$ is forward-biased, thereby turning the transistor off. With diodes 305 and 307 back-biased, a positive potential appears at the base of transistor $T_1$, thereby turning it on. With $T_1$ conducting, current will flow through resistors $R_1$ and $R_2$, thereby causing a fixed bias to appear on the base of transistor $T_3$. Current then flows through resistor $R_3$ and through transistor $T_3$ out to output impedance $Z_o$, which is that impedance to stabilize the system in view of its transient characteristics. This current through impedance $Z_o$, which is proportional to pulse width, generates the output voltage $V_o$, necessary for operating the voltage controlled frequency source.

When, however, the output signals $FF_2$ and $W_r$ are in the "low" or "negative" voltage state, diodes 305 and 307 are turned on while diodes 309 and 311 are cut off. Transistor $T_1$ is now switched off while transistor $T_2$ is switched on. In a similar manner as for transistor $T_1$ above, current flows from ground through transistor $T_2$ and resistors $R_1$ and $R_2$. This switches transistor $T_4$ on and current then flows from ground through output impedance $Z_o$ through transistor $T_4$, through resistor $R_3$ to the negative voltage supply. The output voltage $V_o$ in this instance, then, becomes a negative voltage for application to the voltage controlled frequency source.

The operation of FIG. 3 can thus be seen in conjunction with the description above. If the signal $FF_2$ on line 301 is in the "high" or ground state for a longer time than the time width of pulses in signal $W_r$, this indicates that the reference frequency $W_r$ is greater than the feedback frequency $W_f$. Note the operation of the comparison circuit in FIG. 2. When the feedback frequency $W_f$ is less than the reference frequency $W_r$, it indicates that the operation of the apparatus generating the signal $W_f$ is operating slower than the reference frequency $W_r$. Returning to FIG. 3, in this instance, transistor $T_1$ will be maintained on for a longer period of time than transistor $T_2$, thereby generating a positive voltage $V_o$ at the output. This positive voltage is responded to by the voltage controlled oscillator in order to increase the frequency output from the oscillator. In the example seen in FIG. 1, the motor would thus turn at a faster rate to increase the rate at which frequency $W_f$ is generated.

If in the instance where frequency $W_r$ remains high in relation to signal $FF_2$, this indicates that the feedback frequency is greater than the reference frequency. Thus, transistor $T_2$ in FIG. 3 would be held on for a longer period of time and transistor $T_1$ thereby generates the negative voltage $V_o$ at the output seen in FIG. 3 to the voltage controlled oscillator. This output voltage would therefore decrease the output frequency from the voltage controlled oscillator to slow down the operation of its controlled apparatus, which in FIG. 1 is motor 115. It is seen, therefore, that the above circuit effectively integrates the signal from the output of the comparison circuit in FIG. 2 for operation of the voltage controlled oscillator in accordance with the detected phase of the reference and feedback frequencies.

In the foregoing, there has been disclosed apparatus for effectively controlling the output from a voltage controlled oscillator for use in phase comparison and/or speed control of an output apparatus. While the invention has been described with reference to specific embodiments, it will be understood by those skilled in the art that various changes may be made and equivalents may be substituted for elements thereof without departing from the true spirit and scope of the invention. In addition, many modifications may be made to adapt a particular situation to the invention without departing from the essential teachings thereof.

What I claim is:

1. A phase comparison control system for maintaining an operating frequency signal in synchronization with a reference frequency signal comprising:
    means for comparing said operating frequency signal and said reference frequency signal and generating rectangular shaped pulses the time duration thereof being directly proportional to the phase difference between said signals, said comparing means comprising:
        flip-flop circuit means for generating said rectangular shaped pulses, said flip-flop circuit means comprising first, second, and third flip-flop circuits being set in the order of the first, second, and third flip-flop circuits by the reference frequency signal, and said flip-flop circuits being reset in the order of the third, second, and first flip-flop circuits by the operating frequency signal, said second flip-flop circuit remaining in a set condition when said reference signal frequency is greater than said operating signal frequency and remaining in a reset condition when said operating signal frequency is greater than said reference signal frequency,
    mean for integrating said rectangular-shaped pulses for generating an output voltage about a median voltage, wherein said median voltage is the value indicative of said operating signal frequency being equal to said reference signal frequency, said integrating means comprising:

first means for generating a first current of one polarity when said operating signal frequency is greater than said reference signal frequency, second means for generating a second current of the other polarity when said reference signal frequency is greater than said operating signal frequency, and impedance means coupled to said first and second means for generating said output voltage in response to said first and second currents, voltage controlled oscillator means for generating said operating frequency signal in response to said output voltage, said output voltage being higher in value than said voltage when said operating signal frequency is less than said reference signal frequency thereby tending to increase said operating signal frequency, and said output voltage being lower in value than said median voltage when said operating signal frequency is greater than said reference signal frequency thereby tending to decrease said operating signal frequency.

2. The system as set forth in claim 1 further including alternating current motor means coupled to said voltage controlled oscillator means for increasing and decreasing the rotational speed thereof in response to the increasing and decreasing operating signal frequencies.

3. The system as set forth in claim 1 further including direct current motor means coupled directly to said integrating means for increasing and decreasing the rotational speed thereof in response to the increasing and decreasing operating signal frequencies.

PO-1050
(5/69)

UNITED STATES PATENT OFFICE
CERTIFICATE OF CORRECTION

Patent No. 3,582,797             Dated June 1, 1971

Inventor(s) Alton F. Riethmeier

It is certified that error appears in the above-identified patent and that said Letters Patent are hereby corrected as shown below:

Page 1, column 1, line 6, correct the spelling of the Assignee herein to read "Xerox Corporation".

Column 5, line 15, before "voltage", insert --median--.

Signed and sealed this 19th day of October 1971.

(SEAL)
Attest:

EDWARD M. FLETCHER, JR.      ROBERT GOTTSCHALK
Attesting Officer               Acting Commissioner of Patents